United States Patent
Prentice

(10) Patent No.: US 10,436,056 B2
(45) Date of Patent: Oct. 8, 2019

(54) RELATIVE POSITION MEASUREMENT

(71) Applicant: General Electric Company, Schenectady, NY (US)

(72) Inventor: Ian Francis Prentice, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 514 days.

(21) Appl. No.: 14/747,114

(22) Filed: Jun. 23, 2015

(65) Prior Publication Data

US 2016/0376912 A1 Dec. 29, 2016

(51) Int. Cl.
| | | |
|---|---|---|
| *F01D 17/12* | (2006.01) | |
| *F01D 17/02* | (2006.01) | |
| *F04D 29/32* | (2006.01) | |
| *G01B 7/30* | (2006.01) | |
| *G01D 5/20* | (2006.01) | |
| *F04D 27/00* | (2006.01) | |

(52) U.S. Cl.
CPC ............. *F01D 17/12* (2013.01); *F01D 17/02* (2013.01); *F04D 27/001* (2013.01); *F04D 29/323* (2013.01); *G01B 7/30* (2013.01); *G01D 5/20* (2013.01); *F05D 2220/36* (2013.01); *F05D 2270/821* (2013.01)

(58) Field of Classification Search
CPC ........ F01D 7/00; F04D 29/323; F04D 29/362; B64C 11/44
See application file for complete search history.

(56) References Cited

U.S. PATENT DOCUMENTS

| | | | |
|---|---|---|---|
| 3,253,658 A | 5/1966 | Bradley | |
| 4,948,337 A * | 8/1990 | Martin | ................. B64C 11/301 416/147 |
| 5,211,539 A | 5/1993 | McCarty | |
| 5,595,474 A | 1/1997 | Girard | |

(Continued)

FOREIGN PATENT DOCUMENTS

| | | |
|---|---|---|
| CN | 200949489 Y | 9/2007 |
| EP | 0652154 A1 | 5/1995 |

(Continued)

OTHER PUBLICATIONS

Machine translation and a Decision to Grant issued in connection with corresponding JP Application No. 2016-119478 dated Oct. 10, 2017.

(Continued)

*Primary Examiner* — Carlos A Rivera
*Assistant Examiner* — Cameron A Corday
(74) *Attorney, Agent, or Firm* — Dority & Manning, P.A.

(57) ABSTRACT

A feedback sensor system is provided. The feedback sensor system includes a first ring rotatable about an axial direction and a second ring also rotatable about the axial direction. The first ring includes one or more first ring features and the second ring includes one or more second ring features. The feedback sensor system also includes a sensor directed at the surface of the first ring for sensing a parameter influenced by the one or more first ring features and the one or more second ring features. The sensor may determine a position of the first ring relative to the second ring by sensing the parameter.

18 Claims, 6 Drawing Sheets

(56) References Cited

U.S. PATENT DOCUMENTS

| | | | |
|---|---|---|---|
| 5,625,239 A * | 4/1997 | Persson | G01D 5/2073 310/171 |
| 5,865,599 A | 2/1999 | Pruden et al. | |
| 6,424,928 B1 * | 7/2002 | Elliott | G01D 3/08 702/113 |
| 6,564,664 B1 | 5/2003 | Battlogg | |
| 6,745,621 B1 | 6/2004 | LeRoux Cilliers et al. | |
| 6,794,776 B1 | 9/2004 | Gabrys | |
| 6,907,342 B1 | 6/2005 | Matsuoka | |
| 7,318,403 B1 | 1/2008 | Huart et al. | |
| 7,506,452 B1 | 3/2009 | Vanneman et al. | |
| 7,508,154 B1 | 3/2009 | Labriola, II | |
| 7,843,102 B1 | 11/2010 | Wyremba | |
| 8,549,931 B2 | 10/2013 | Bodin | |
| 8,575,871 B1 | 11/2013 | Moore | |
| 2002/0145349 A1 | 10/2002 | Astengo | |
| 2002/0158523 A1 | 10/2002 | Abadia et al. | |
| 2002/0171315 A1 | 11/2002 | Kastinger | |
| 2003/0065437 A1 | 4/2003 | Wuerfel et al. | |
| 2003/0090261 A1 | 5/2003 | Beckmann et al. | |
| 2003/0231014 A1 | 12/2003 | Moretti et al. | |
| 2004/0032997 A1 | 2/2004 | Kasper | |
| 2004/0066105 A1 | 4/2004 | Kim | |
| 2005/0029890 A1 | 2/2005 | Kadoya et al. | |
| 2005/0064978 A1 | 3/2005 | Moore et al. | |
| 2005/0075827 A1 | 4/2005 | Tsuruhara et al. | |
| 2005/0082928 A1 | 4/2005 | Giles et al. | |
| 2005/0088171 A1 | 4/2005 | Gualtieri | |
| 2005/0172732 A1 | 8/2005 | Feng et al. | |
| 2006/0001417 A1 | 1/2006 | Clark | |
| 2006/0187654 A1 | 8/2006 | Jungel-Schmid et al. | |
| 2006/0197393 A1 | 9/2006 | Labriola, II | |
| 2006/0208450 A1 | 9/2006 | Rizzetto | |
| 2006/0290216 A1 | 12/2006 | Burse | |
| 2007/0068015 A1 * | 3/2007 | Perret | F01L 1/02 33/1 PT |
| 2007/0090961 A1 | 4/2007 | Gerez | |
| 2008/0061653 A1 | 3/2008 | Sagara et al. | |
| 2008/0083168 A1 | 4/2008 | Booth et al. | |
| 2008/0110283 A1 | 5/2008 | Shaver et al. | |
| 2008/0127746 A1 | 6/2008 | Ertler | |
| 2008/0148580 A1 | 6/2008 | Maier et al. | |
| 2008/0158039 A1 | 7/2008 | Kassner | |
| 2009/0000357 A1 | 1/2009 | Uusivirta et al. | |
| 2009/0025298 A1 | 1/2009 | Hawkins et al. | |
| 2009/0039822 A1 | 2/2009 | Kimura et al. | |
| 2009/0107209 A1 | 4/2009 | Limoges | |
| 2009/0126369 A1 | 5/2009 | Walitzki et al. | |
| 2009/0145303 A1 | 6/2009 | Lebuffe et al. | |
| 2009/0156346 A1 | 6/2009 | Donofrio et al. | |
| 2009/0193894 A1 | 8/2009 | Kabatzke | |
| 2009/0282943 A1 | 11/2009 | Muller | |
| 2009/0315543 A1 | 12/2009 | Guo et al. | |
| 2010/0007512 A1 | 1/2010 | Ghovanloo et al. | |
| 2010/0009831 A1 | 1/2010 | Ryu et al. | |
| 2010/0017062 A1 | 1/2010 | Muller et al. | |
| 2010/0029150 A1 | 2/2010 | Gai et al. | |
| 2010/0133828 A1 | 6/2010 | Stegemann et al. | |
| 2010/0180696 A1 | 7/2010 | Islam et al. | |
| 2010/0199457 A1 | 8/2010 | Park et al. | |
| 2010/0225308 A1 | 9/2010 | Kurumado et al. | |
| 2010/0259208 A1 | 10/2010 | Hao et al. | |
| 2011/0037422 A1 | 2/2011 | Pollock et al. | |
| 2011/0053733 A1 | 3/2011 | Swales et al. | |
| 2011/0056309 A1 | 3/2011 | Cazaux et al. | |
| 2011/0089936 A1 | 4/2011 | Putinier | |
| 2011/0151941 A1 | 6/2011 | Chan | |
| 2011/0308331 A1 | 12/2011 | Bodin | |
| 2012/0209494 A1 | 8/2012 | Verdejo et al. | |
| 2012/0241566 A1 | 9/2012 | Lauterberg | |
| 2012/0328433 A1 | 12/2012 | Quiroz-Hernandez | |
| 2013/0259724 A1 | 10/2013 | Steinbauer et al. | |
| 2014/0288865 A1 | 9/2014 | Russhard et al. | |
| 2014/0375312 A1 | 12/2014 | Friedrich et al. | |

FOREIGN PATENT DOCUMENTS

| | | |
|---|---|---|
| EP | 1994369 A2 | 11/2008 |
| EP | 2537747 A1 | 12/2012 |
| JP | S49-107758 A | 10/1974 |
| JP | S62-006897 A | 1/1987 |
| JP | 2001-099680 A | 4/2001 |
| WO | 2014163678 A2 | 10/2014 |

OTHER PUBLICATIONS

Notification of Reasons for Refusal issued in connection with corresponding JP Application No. 2016-119478 dated May 30, 2017.

A European Search Report and Opinion issued in connection with corresponding EP Application No. 6174267.1 dated Nov. 11, 2016.

First Office Action and Search issued in connection with corresponding CN Application No. 201610460894.1 dated Apr. 25, 2018.

* cited by examiner

RELATIVE POSITION MEASUREMENT

FIELD OF THE INVENTION

The present subject matter relates generally to a feedback sensor for determining a position of one ring relative to another.

BACKGROUND OF THE INVENTION

A gas turbine engine generally includes a fan and a core arranged in mechanical communication with one another. Additionally, the core of the gas turbine engine general includes, in serial flow order, a compressor section, a combustion section, a turbine section, and an exhaust section. In operation, air flows through an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the combustion section and is then routed through the exhaust section, e.g., to atmosphere. In particular configurations, the turbine section is mechanically coupled to the compressor section by one or more shafts extending along an axial direction of the gas turbine engine.

The fan includes a plurality of blades having a radius larger than the core of the gas turbine engine; the fan and plurality of blades being driven by or rotatable with the one or more shafts. For certain gas turbine engines, the fan is a variable pitch fan such that the plurality of blades are each rotatable about a respective pitch axis by a pitch change mechanism. The pitch change mechanism may rotate each of the plurality of blades about their respective pitch axes by changing its angular position relative to the plurality of blades and the one or more shafts.

It can be beneficial, in certain embodiments, to include a feedback sensor, to measure a position of the pitch change mechanism relative to the plurality of blades to measure the pitch of the plurality of blades. Typically, the pitch change mechanism is positioned at least partially within or adjacent to the one or more shafts. Accordingly, in order to measure a position of the pitch change mechanism relative to the plurality of blades and the one or more shafts, the one or more shafts must include elongated slots or openings to provide a sensor with a line of sight to the pitch change mechanism. However, such a configuration may weaken the one or more shafts or require additional bolstering of the one or more shafts to accommodate the elongated slots or openings. Alternatively, a sensor may be placed within the one or more shafts, the sensor connected to a controller of the gas turbine engine using, e.g., a wireless communication network. However, such a configuration can be unreliable.

Accordingly, a sensor capable of measuring a position of the pitch change mechanism relative to the one or more shafts without requiring an elongated slot or opening would be useful. More specifically, a sensor capable of measuring a position of the pitch change mechanism relative to the one or more shafts through the one or more shafts would be particularly useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a feedback sensor system is provided. The feedback sensor system includes a first ring rotatable about an axial direction. The first ring includes a surface having one or more first ring features. The feedback sensor system also includes a second ring rotatable about the axial direction. The second ring includes a surface having one or more second ring features. The feedback sensor system also includes a sensor directed at the surface of the first ring for sensing a parameter influenced by the one or more first ring features and the one or more second ring features to determine a position of the first ring relative to the second ring.

In another exemplary aspect of the present disclosure, a method is provided for determining a position of a first ring relative to a second ring in a gas turbine engine. The first ring includes a surface having one or more first ring features and the second ring includes a surface having one or more second ring features. The method includes directing a sensor towards the surface of the first ring, sensing with the sensor a parameter influenced by the one or more first ring features and the one or more second ring features, and determining a position of the first ring relative to the second ring based on the parameter sensed with the sensor.

In yet another exemplary embodiment of the present disclosure, a gas turbine engine defining an axial direction is provided. The gas turbine engine includes a turbine section mechanically coupled to a compressor section through a shaft, and a fan driven by the shaft. The fan includes a plurality of fan blades. The gas turbine engine also includes an actuation member in mechanical communication with the plurality of fan blades for changing a pitch of the plurality of fan blades. The gas turbine engine also includes a feedback sensor system. The feedback sensor system includes a first ring rotatable with the shaft of the gas turbine engine. The first ring includes a surface having one or more first ring features. The feedback sensor also includes a second ring rotatable with the actuation member of the gas turbine engine. The second ring includes a surface having one or more second ring features. The feedback sensor also includes a sensor directed at the surface of the first ring for sensing a parameter influenced by the one or more first ring features and the one or more second ring features to determine a position of the first ring relative to the second ring.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
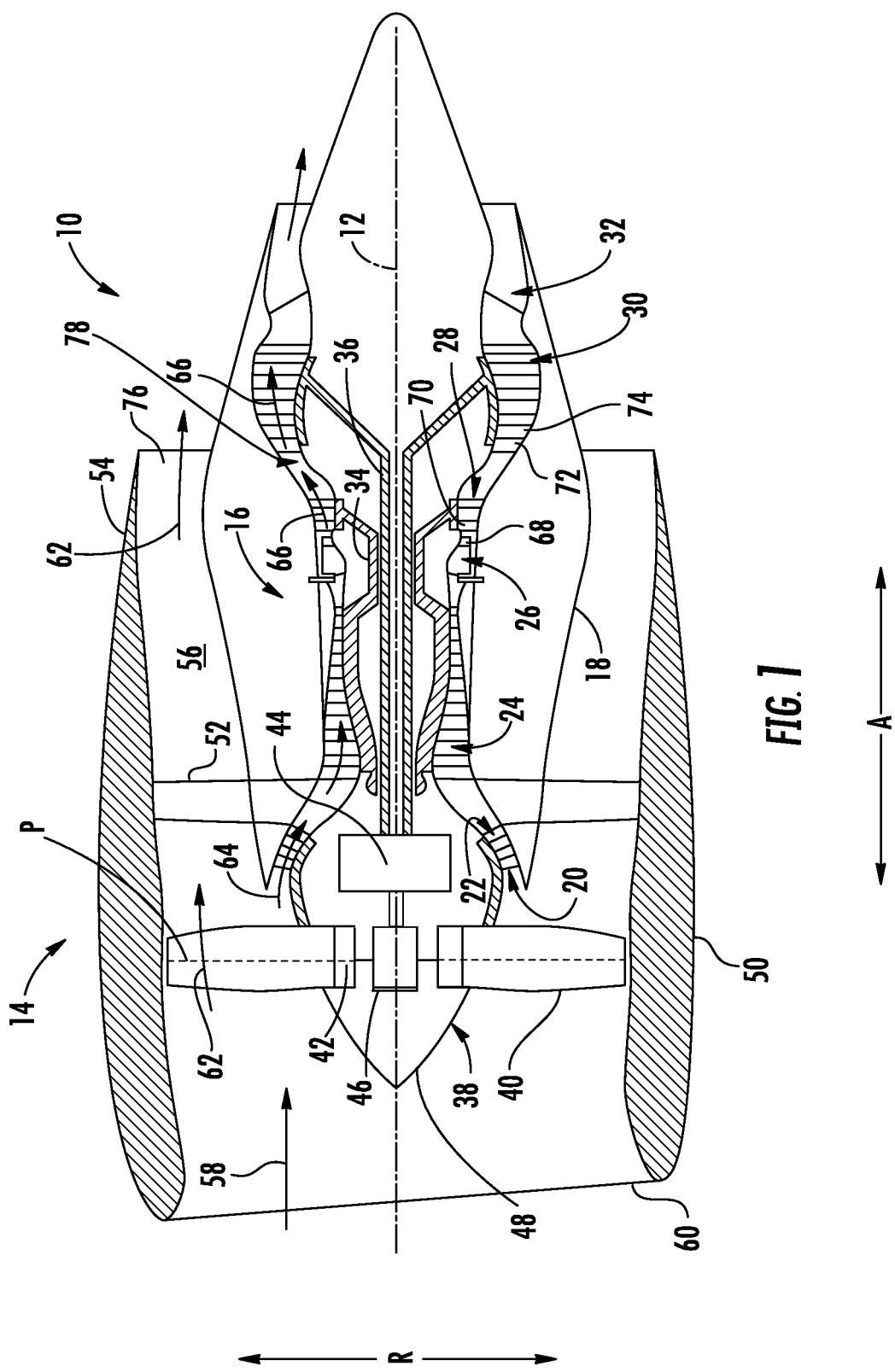
FIG. 1 is a schematic cross-sectional view of a gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (not marked). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. The fan blades 40 and disk 42 are together rotatable about the longitudinal axis 12 in the circumferential direction by LP shaft 36 across a power gear box 44. The power gear box 44 includes a plurality of gears for stepping down the rotational speed of the LP shaft 36 to a more efficient rotational fan speed. Additionally, each fan blade 40 is rotatable relative to the disk 42 about a pitch axis P by virtue of the fan blades 40 being operatively coupled to a suitable actuation member 46. The actuation member 46 is configured to collectively vary the pitch of the fan blades 40 in unison. Further, for the embodiment depicted, the actuation member 46 is also rotatable about the longitudinal axis 12 in the circumferential direction. The actuation member 46 varies the pitch of each fan blade 40 in part by changing its angular position relative to the plurality of blades 40 and LP shaft 36. For example, during operation, at least a portion of the actuation member 46 may temporarily speed up or slow down relative to the plurality of blades 40 and LP shaft 36 to change its angular position relative to the plurality of fan blades 40 and LP shaft 36 and vary the pitch of each of the plurality of blades 40.

Referring still to the exemplary embodiment of FIG. 1, the disk 42 is covered by rotatable front spinner 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated by those of ordinary skill in the art that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10 also providing propulsive thrust. The HP turbine 28, the LP turbine 30, and the jet exhaust nozzle section 32 at least partially define a hot gas path 78 for routing the combustion gases 66 through the core turbine engine 16.

Although not depicted, the operation of the turbofan engine 10 may be monitored by several sensors, such as pressure and/or temperature sensors, detecting various conditions of, e.g., the compressor section, the turbine section, combustion section 26, and/or the ambient environment. Additionally, as will be discussed in greater detail below, the turbofan engine 10 may additionally include a feedback sensor system 100 (see FIG. 2) for measuring a position of the actuation member 46 relative to the LP shaft 36 to determine a pitch of the plurality of fan blades 40. The sensors, including the feedback sensor system 100, may be in operable communication with a controller (not shown), included to control certain aspects of the turbofan engine 10. The controller may generally be any turbine engine control system known in the art that permits a turbine engine to be controlled and/or operated as described herein. Generally, the controller may include any computer system having one or more processor(s) and associated memory device(s) configured to perform a variety of computer-implemented functions to control the turbofan engine 10. For example, the controller may include a full-authority digital electronic control (FADEC) control system used in control of certain aircraft engines.

It should be appreciated, that as used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. The memory devices may include software or other control instructions that, when executed by the processor, performs desired functions.

It should be appreciated, that the turbofan engine 10 depicted in FIG. 1 is by way of example only, and that in other exemplary embodiments, any other suitable gas turbine engine may be provided. For example, in other exemplary embodiments, the turbofan engine 10 may be an unducted turbofan engine, may or may not include a power gear box 44, and/or may or may not include a variable pitch fan 38. As used herein, the term 'fan' may refer to fan 38 of a ducted turbofan engine, such as turbofan engine 10, to fan components of an unducted turbofan engine, and/or to propeller components of a turboprop engine.

Figure 2:
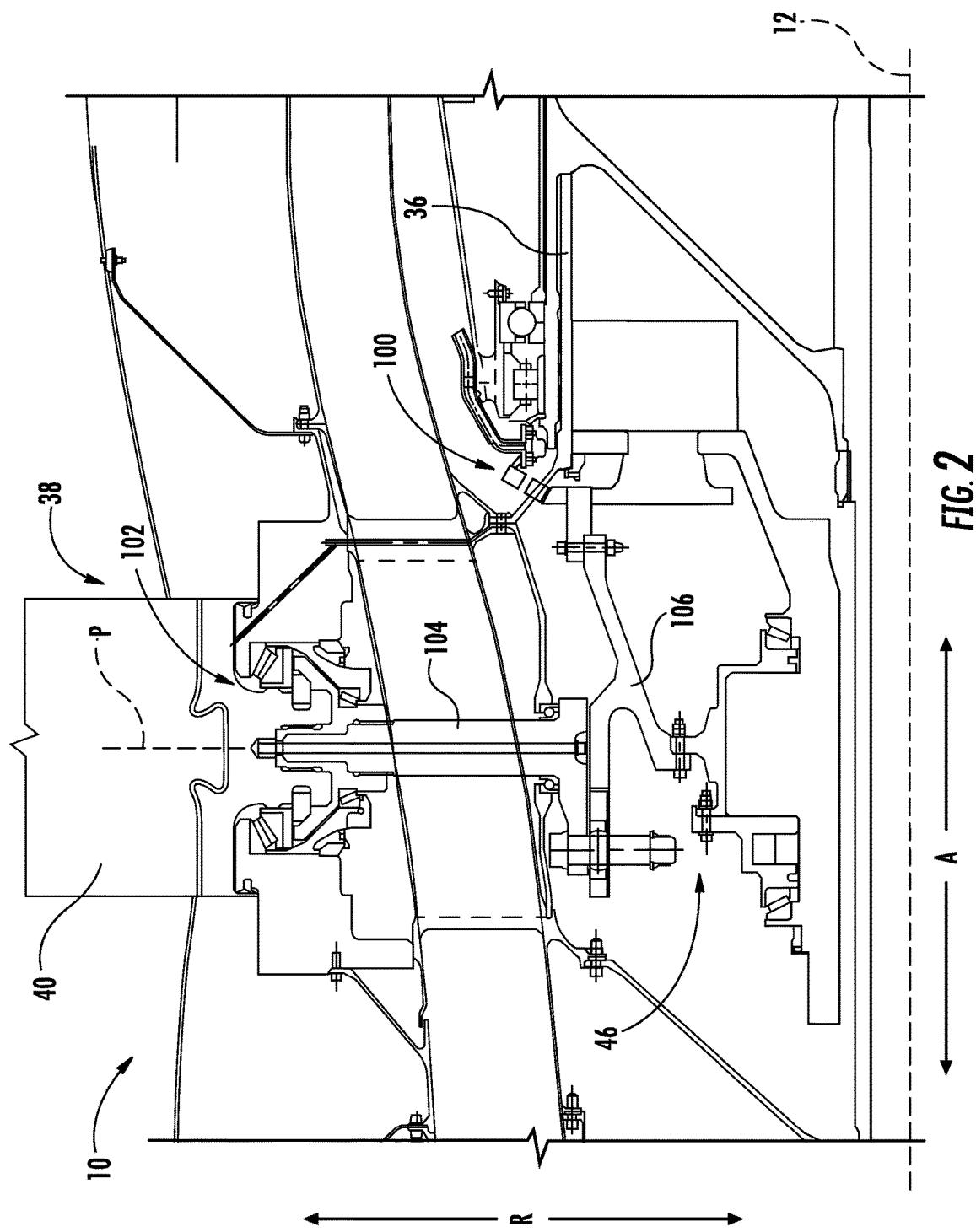
FIG. 2 is a schematic view of a forward end of a gas turbine engine in accordance with an exemplary embodiment of the present disclosure.

Referring now to FIG. 2, a close-up view is provided of a forward end of a turbofan engine 10 in accordance with an exemplary embodiment of the present disclosure. Particularly, the close-up view of FIG. 2 depicts a portion of a fan 38 at a forward end of the turbofan engine 10, the turbofan engine 10 including a feedback sensor system 100 in accordance with an exemplary embodiment of the present disclosure. For the exemplary embodiment depicted, an LP shaft 36 is attached to a disk 42 of the fan 38 and the fan 38 is driven by the LP shaft 36. Each of a plurality of fan blades 40 are, in turn, attached to the disk 42 through a plurality of respective trunnion mechanisms 102. The trunnion mechanisms 102 allow for rotation of a respective fan blade 40 about a respective pitch axis P.

Additionally, an actuation member 46 is positioned inward of the disk 42 and trunnion mechanism 102 of the fan 38 along the radial direction R. The actuation member 46 rotates along with the fan 38 about the centerline 12 in a circumferential direction C (see FIG. 4), for changing a pitch of each of the plurality of fan blades 40. For the embodiment depicted, the actuation member 46 is an angular actuation member 46. More particularly, the actuation member 46 includes a plurality of extensions 104, each extension 104 extending outwardly generally along the radial direction R to a respective trunnion mechanism 102. The extension 104 rotates a respective trunnion mechanism 102 and fan blade 40 within the disk 42 to change the pitch of such fan blade 40. Rotation of the extension 104 changes an angular position of an arm 106 of the actuation member 46 relative to the LP shaft 36, disk 42, and plurality of fan blades 40.

Accordingly, for the embodiment depicted, the pitch of each fan blade 40 in the plurality of fan blades 40 may be measured by measuring an angular position of the actuation member 46, or more particularly, the arm 106 of the actuation member 46, relative to the LP shaft 36. The feedback sensor system 100 is included to make such a measurement. More particularly, the feedback sensor system 100 is included to make such a measurement without requiring any holes, slots, opening, etc. in the LP shaft 36 that would provide a sensor with a physical line of sight to the actuation member 46. Accordingly, with such an embodiment, the LP shaft 36 need not be weakened in order to measure the position of the actuation member 46 relative to the LP shaft 36.

Figure 3:
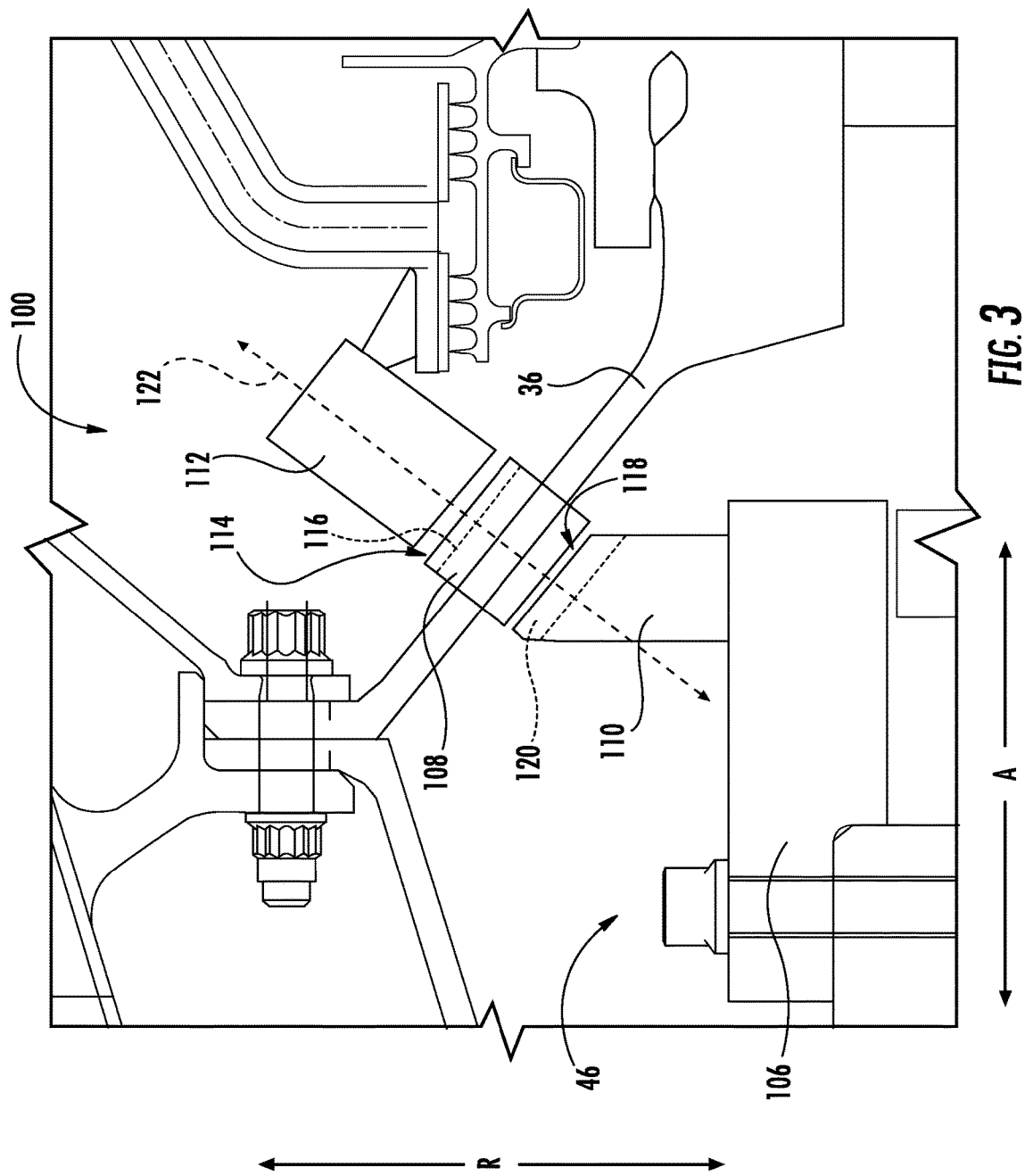
FIG. 3 is a close up, schematic view of the forward end of the exemplary gas turbine engine of FIG. 2, including a feedback sensor system in accordance with an exemplary embodiment of the present disclosure.

Referring now also to FIG. 3, providing a close-up view of the feedback sensor system 100 of FIG. 2, the feedback sensor system 100 generally includes a first ring 108 rotatable about the axial direction A of the turbofan engine 10, a second ring 110 also rotatable about the axial direction A of the turbofan engine 10, and a sensor 112. For the embodiment depicted, the first ring 108 is rotatable with the LP shaft 36, or more particularly, is attached to the LP shaft 36; the second ring 110 is rotatable with the actuation member 46, or more particularly, is attached in a fixed manner to the arm 106 of the actuation member 46; and the sensor 112 is attached to a stationary component, i.e., a non-rotating component, and is in a fixed position proximate to the first ring 108. For the embodiment depicted, the first ring 108 defines a surface 114 that extends substantially parallel to a surface 118 of the second ring 110, such that the second ring 110 is nested within the first ring 108. Additionally, the surfaces 114, 118 of the first and second rings 108, 110 define an angle greater than zero with respect to the axial direction A of the turbofan engine 10.

The first and second rings 108, 110 may each be formed of rigid materials having a substantially permanent annular shape and attached within the turbofan engine 10 using any suitable attachment means. For example, one or both of the first and second rings 108, 110 may be formed integrally with a component and the turbofan engine 10, e.g., by welding, or alternatively may be attached to the component within the turbofan engine 10 using one or more suitable mechanical fasteners. Additionally, or alternatively, one or both of the first and second rings 108, 110 may be formed of one or more flexible materials and be given their "ring" or "annular" shape by attachment to the respective component.

Figure 4:
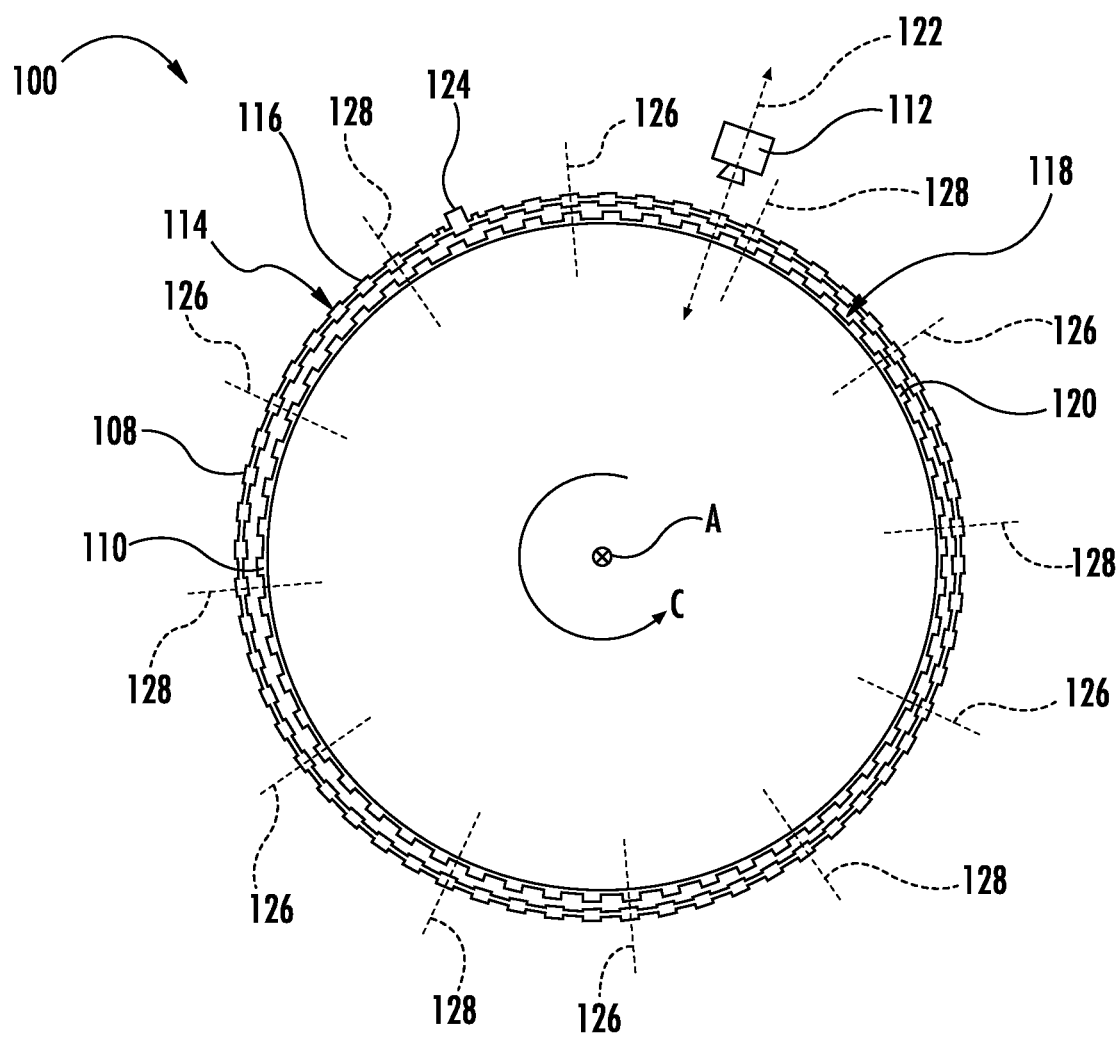
FIG. 4 is a cross-sectional view of the exemplary feedback sensor system of FIG. 3.

Referring now also to FIG. 4, a cross-sectional view of the feedback sensor system 100 of FIG. 2 is provided, taken along the axial direction A of the turbofan engine 10. As shown, the surface 114 of the first ring 108 includes one or more first ring features 116 and the surface 118 of the second ring 110 similarly includes one or more second ring features 120. The sensor 112 is directed at the surface 114 of the first ring 108 for sensing a parameter influenced by the one or more first ring features 116, the one or more second ring features 120, and a separation distance between the sensor 112 and the first and second rings 108, 110 to determine a position of the first ring 108 relative to the second ring 110. More particularly, the sensor 112 defines a sensing axis 122. The sensor 112 is positioned a predetermined separation distance away from the first and second rings 108, 110 along the sensing axis 122 and is positioned such that the sensing axis 122 extends through the surface 114 of the first ring 108 and through the surface 118 of the second ring 110.

For the embodiment depicted, the one or more first ring features 116 are a plurality of first ring teeth spaced along the surface 114 of the first ring 108 and the one or more second ring features 120 are a plurality of second ring teeth spaced along the surface 118 of the second ring 110. Notably, for the embodiment depicted, each of the first ring teeth and each of the second ring teeth have substantially the same squared geometry (shape). It should be appreciated, however, that in other exemplary embodiments, the one or more first ring features 116 and the one or more second ring features 120 may have any other suitable geometry. Additionally, as used herein, terms of approximation, such as "substantially" or "about," refer to being within a ten percent (10%) margin of error.

The first ring 108 is a continuous ring about the circumferential direction C, and the second ring 110 is also a continuous ring about the circumferential direction C. The first ring 108 defines a thickness at each of the one or more first ring features 116 that is greater than a thickness between each adjacent first ring 108 feature. Similarly, the second ring 110 defines a thickness at each of the one or more second ring features 120 that is greater than a thickness between each adjacent second ring 110 feature. As used herein, the thickness of the first and second rings 108, 110 refers to a thickness along the sensing axis 122.

The first ring 108 additionally includes a marker 124 having a geometry different than the plurality of first ring features 116. More particularly, for the embodiment depicted, the first ring 108 defines a thickness at the marker 124 that is greater than a thickness through the one or more first ring features 116. It should be understood, however, that in other embodiments, the marker 124 may have any other geometry to distinguish itself from the one or more first ring features 116. As will be discussed below, the marker 124 indicates a new revolution of the first ring 108. Additionally, the marker 124 and the one or more first ring features 116 are evenly spaced along the surface 114 of the first ring 108 about the circumferential direction C. Similarly, the one or more second ring features 120 are also evenly spaced on the surface 118 of the second ring 110 about the circumferential direction C.

Notably, the surface 118 of the second ring 110 has a different number of second ring features 120 than the surface 114 of the first ring 108 has first ring features 116. For example, in the embodiment depicted, the surface 118 of the second ring 110 has six (6) less second ring features 120 than the surface 114 of the first ring 108 has first ring features 116. It should be appreciated, however, that in other exemplary embodiments, the surface 118 of the second ring 110 may have any other suitable number of second ring features 120. For example, in other exemplary embodiments, the surface 118 of the second ring 110 may have at least four (4) less second ring features 120 than the surface 114 of the first ring 108 has first ring features 116, or at least two (2) less second ring features 120 than the surface 114 of the first ring 108 has first ring features 116. Alternatively, however, in other exemplary embodiments, the surface 118 of the second ring 110 may have more second ring features 120 than the surface 114 of the first ring 108 has first ring features 116.

For the embodiment depicted, a first ring feature 116 only overlaps directly with a second ring feature 120 in a few places along the circumferential direction C. Such is a result of the even spacing of the marker 124 and the first ring features 116 on the surface 114 of the first ring 108, the even spacing of the second ring features 120 on the surface 118 of the second ring 110, and the differing number of first ring features 116 and second ring features 120. As stated, for the embodiment depicted, the second ring 110 has six (6) less second ring features 120 than the first ring 108 has first ring features 116. Accordingly, for the embodiment depicted, the first ring features 116 and second ring features 120 overlap directly at six (6) peaks 126 along the circumferential direction C.

Moreover, the feedback sensor system 100 is configured to determine an angular position of the first ring 108 relative to the second ring 110 based on an amount of overlap of the first ring features 116 and the second ring features 120. More particularly, for the embodiment depicted the parameter sensed by the sensor 112, which is influenced by the one or more first ring features 116 and the one or more second ring features 120, is a magnetic flux. The first ring 108, or at least the first ring features 116, may therefore be formed of a ferrous material and the second ring 110, or at least the second ring features 120, may similarly be formed of a ferrous material. Thus, at the peaks 126, where a first ring 108 feature overlaps directly with a second ring 110 feature, an amount of magnetic flux sensed by the sensor 112 is relatively high. By contrast, between peaks 126, where a first ring 108 feature is positioned between adjacent second ring features 120, i.e., a valley 128, the amount of magnetic flux sensed by the sensor 112 is relatively low. Moreover, given the differing geometry of the marker 124 relative to the first ring features 116, the amount of magnetic flux sensed by the sensor 112 when the marker 124 passes under the sensor 112 is even higher than the amount of magnetic flux sensed the sensor 112 at the peaks 126. Such a configuration allows the feedback sensor system 100 to determine a full rotation of the first ring 108. Such a configuration also allows the sensor 112 to determine an angular position of the first ring 108 relative to the second ring 110 based on the sensed position of the marker 124 relative to the sensed peaks 126 and valleys 128.

It should be appreciated, however, that in other exemplary embodiments, the one or more first and second ring features 116, 120 may be magnetized in any other suitable manner. For example, in other exemplary embodiments, one or both of the first and second rings 108, 110 may be configured as electromagnets. Notably, with such a configuration, one or both of the first and second rings 108, 110 may not include features extending proud of a respective surface of the first and second rings 108, 110. For example, the first and second ring features 116, 120 may include, e.g., coils or other wire configurations having an electrical charge, such that one or both of the first and second rings 108, 110 define discrete areas having a magnetic field.

Figure 5:
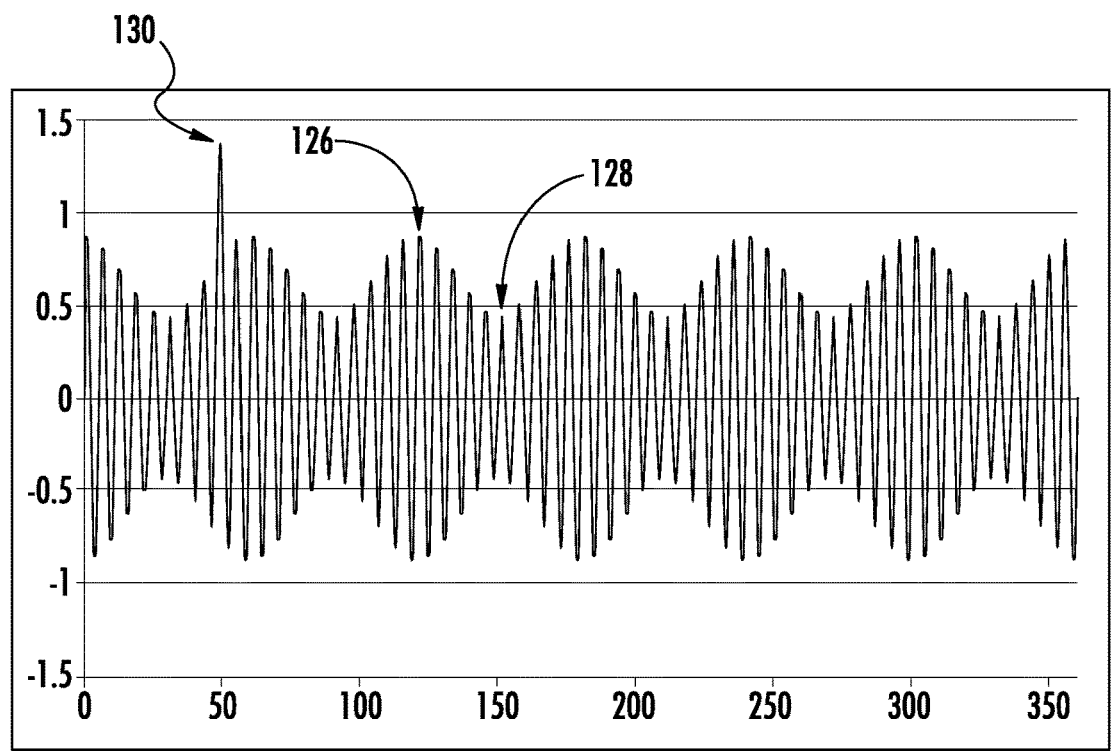
FIG. 5 is a graph depicting parameter values sensed by the exemplary feedback sensor system of FIG. 3.

Referring now to FIG. 5, a graph is provided of exemplary parameter values sensed by the sensor 112 during operation of the exemplary feedback sensor system 100 of FIG. 2. The graph includes degrees of rotation on the X-axis and units of the parameter value sensed on the Y-axis (normalized to zero). As shown, the sensor 112 senses a phase of the parameter, oscillating between peaks 126 and valleys 128. The sensor 112 also senses an outlier 130 in response to the marker 124 passing under the sensor 112. The outlier 130 indicates a new revolution of the first and second rings 108, 110. Additionally, as previously stated the sensor 112 may determine an angular position of the first ring 108 relative to the second ring 110 based on the position of the marker 124/outlier 130 relative to the sensed phase of parameter values.

Notably, as previously discussed, the surface 118 of the second ring 110 includes six (6) less second ring features 120 than the surface 114 of the first ring 108 includes first ring features 116. Accordingly, the phase of sensed parameters repeats six (6) times per revolution (i.e., per 360 degrees of rotation). With such a configuration, the feedback sensor system 100 may determine relative angular positions between minus thirty degrees and plus thirty degrees, for a total range of up to sixty degrees. Notably, the actuation member 46 for the exemplary embodiment of FIG. 2, above, requires less than sixty degrees of relative angular motion to achieve a full range of pitch changes for each of the plurality of fan blades 40. In other exemplary embodiments, however, the actuation member 46 may require more than sixty degrees of relative angular motion to achieve the full range of pitch changes for each of the plurality of fan blades 40. By modifying the number of first ring features 116 on the surface 114 of the first ring 108 and the number of second ring features 120 on the surface 118 of the second ring 110, the feedback sensor system 100 may be configured to measure up to 360 degrees of relative motion. For example, by including only one less second ring feature 120 than first ring features 116, the feedback sensor system 100 can measure up to 360 degrees of relative angular motion. Moreover, in still other exemplary embodiments, the sensor 112 may be configured to sense more than 360 degrees of relative motion by, e.g., counting the number of times the marker 124 passes over the 360 degrees mark.

A feedback sensor system in accordance with the present disclosure may therefore more easily sense a position of a first ring relative to a second ring without requiring a direct line of sight to the second ring. Notably, although the exemplary feedback sensor system is depicted being used in conjunction with an actuation member, it should be appreciated that in other embodiments, the exemplary feedback sensor system may instead be used with any other nested components rotatable about the axial direction A wherein it may be difficult to provide a sensor with a direct line of sight to one of such components.

Figure 6:
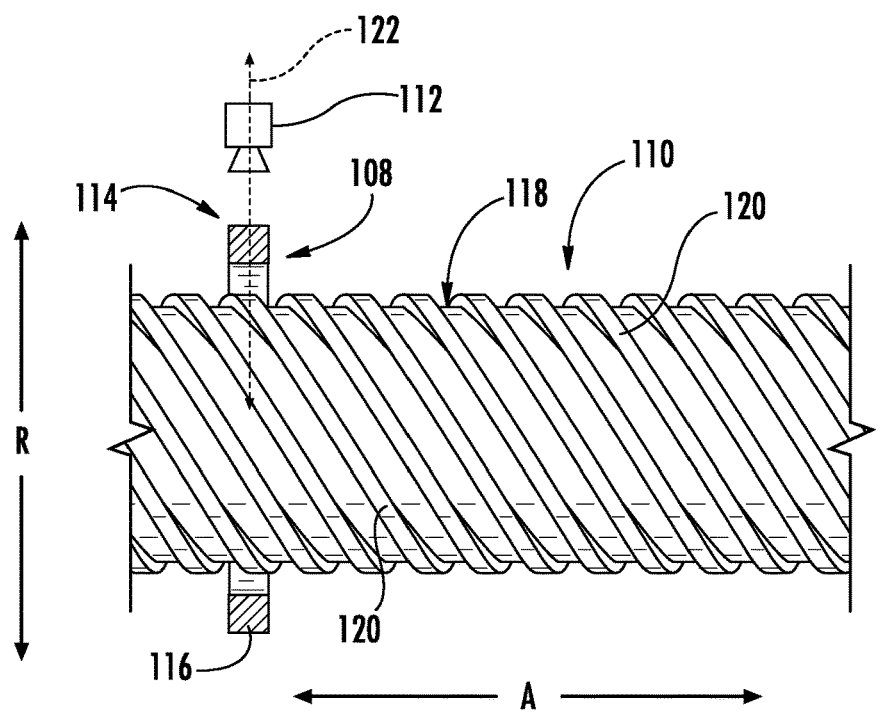
FIG. 6 is a schematic, sectional view of a feedback sensor system in accordance with another exemplary embodiment of the present disclosure.

Referring now to FIG. 6, a sectional view is provided of a feedback sensor system 100 in accordance with another exemplary embodiment of the present disclosure. For the embodiment depicted, the first ring 108 is configured in substantially the same manner as the first ring 108 depicted in FIGS. 2 through 4. For example, the first ring 108 defines an annular shape and includes a surface 114 having a marker 124 (not shown) and one or more first ring features 116. The one or more first ring features 116 are a plurality of teeth spaced on the surface 114 of the first ring 108. The embodiment of FIG. 6 additionally includes a second ring 110 having a surface 118 with one or more second ring features 120. However, for the embodiment of FIG. 6, the one or more second ring features 120 are a plurality of helical ridges 120 extending from the surface 118 of the second ring 110 and in a spiral manner along a length of the second ring 110 (i.e., along the axial direction A). More particularly, for the embodiment depicted, the second ring 110 is configured as a cylinder, and the surfaces 114, 118 of the first and second rings 108, 110 are substantially parallel to the axial direction A. Notably, for the exemplary embodiment depicted, the angular position of the first ring 108 relative to the second ring 110 does not change. However, the axial position of the first ring 108 relative to the second ring 110 does change. Accordingly, the exemplary feedback sensor system 100 of FIG. 6 is configured to determine an axial position of the first ring 108 relative to second ring 110.

More particularly, for the embodiment depicted, as the second ring 110 moves along the axial direction A relative to the first ring 108, the second ring features 120 will align in a different manner with the first ring features 116. Notably, an axial cross-section of the exemplary embodiment of FIG. 6 will look substantially the same as the cross-section depicted in FIG. 4. Additionally, the parameter values sensed by the sensor 112 during operation of the exemplary feedback sensor system 100 of FIG. 6 will look substantially the same as the values depicted in the graph of FIG. 5.

The exemplary embodiment of FIGS. 2 through 4 and/or FIG. 6 may be incorporated into any machine where it is desirable to measure a position of a first ring relative to a second ring. For example, in certain embodiments, the feedback sensor system 100 may be incorporated into a gas turbine engine, such as the turbofan engine 10, including an actuation member 46 that changes a pitch of a plurality of fan blades 40 by moving along the axial direction A relative to the LP shaft 36 and plurality of fan blades 40. Additionally, or alternatively, the exemplary embodiment of FIG. 6 may be used to measure, e.g., a relative thermal expansion between two components of a gas turbine engine nested within each other. Further, although described herein as being incorporated into a gas turbine engine, in other embodiments, the exemplary embodiment of FIGS. 2 through 4 and/or FIG. 6 may instead be incorporated into any other suitable machine.

It should also be appreciated, however, that in still other exemplary embodiments, any other suitable means may be provided for sensing a position of a second ring 110 relative to a first ring 108. For example, in other exemplary embodiments, the parameter sensed by the sensor 112 may not be magnetic flux, and instead may be, e.g., an optical value. For example, in such an exemplary embodiment, the first and second rings 108, 110 may be formed of a transparent or semitransparent material and the one or more first ring features 116 and one or more second ring features 120 may be portions of the first and second rings 108, 110, respectively, more or less transparent than the rest of the first ring 108 and second ring 110. Moreover, in such an exemplary embodiment, a light source may also be positioned within the first ring 108 and second ring 110, and an intensity of light sensed by the sensor 112 (which may be an optical sensor 112) to determine a position of the first ring 108 relative to the second ring 110.

Figure 7:
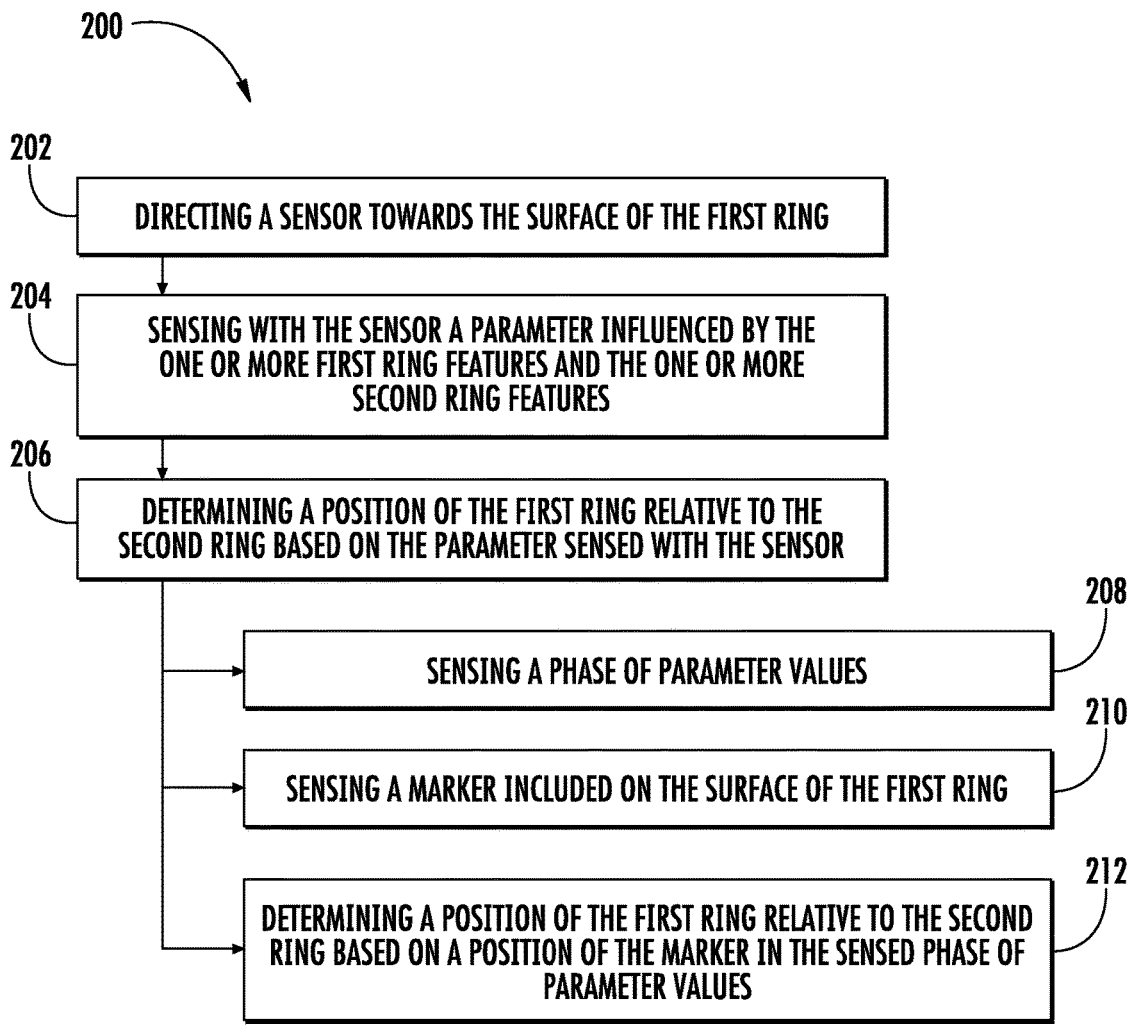
FIG. 7 is a flow diagram of a method for determining a position of a first ring relative to a second ring in a gas turbine engine in accordance with an exemplary aspect of the present disclosure.

Referring now to FIG. 7, a method (200) for determining a position of a first ring relative to a second ring in a gas turbine engine is provided. In certain exemplary embodiments, the exemplary method (200) of FIG. 7 may be used in conjunction with the feedback sensor system 100 described above with reference to FIGS. 2 through 5, or with reference to FIGS. 6 and 7. Accordingly, the first ring may have a surface including one or more first ring features and the second ring may have a surface including one or more second ring features.

The exemplary method (200) includes at (202) directing a sensor towards the surface of the first ring, and at (204) sensing with the sensor a parameter influenced by the one or more first ring features and the one or more second ring features. For example, in certain exemplary embodiments, the parameter may be a magnetic flux. Moreover, the exemplary method (200) additionally includes at (206) determining a position of the first ring relative to the second ring based on the parameter sensed with the sensor. When the exemplary method (200) is used in conjunction with the feedback sensor system of FIGS. 2 through 5, determining a position of the first ring relative to the second ring at (206) may include determining an angular position of the first ring relative to the second ring. By contrast, when the exemplary method (200) is used in conjunction with the feedback sensor system of FIGS. 6 and 7, determining a position of the first ring relative to the second ring at (206) may include determining an axial position of the first ring relative to the second ring.

Further, in certain exemplary aspects of the method (200) depicted in FIG. 7, determining at (206) a position of the first ring relative to the second ring based on the parameter sensed with the sensor may further include at (208) sensing a phase of parameter values, at (210) sensing a marker included on the surface of the first ring, and at (212) determining a position of the first ring relative to the second ring based on a position of the marker in the sensed phase of parameter values.

A method in accordance with the exemplary aspect depicted in FIG. 7 may allow for sensing a position of the first ring relative to the second ring without requiring a line of sight to the second ring. Accordingly, a method in accordance with such an exemplary aspect may allow for sensing an angular or axial position of the first ring relative to the second ring without having any holes, slots, or other openings in the first ring or a component to which the first ring is attached.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A feedback sensor system, the feedback sensor system comprising:
    a shaft assembly rotatable about an axial direction;
    a first ring coupled to or formed integrally with the shaft assembly, the first ring including a surface having one or more first ring features;
    a second ring rotatable about the axial direction and enclosed within the shaft assembly, the second ring including a surface having one or more second ring features; and
    a sensor spaced from the shaft assembly and the first ring and positioned on an opposite side of the shaft assembly than the second ring, the sensor directed at the surface of the first ring and the surface of the second ring for sensing a parameter influenced by the one or more first ring features and the one or more second ring features to determine a position of the first ring relative to the second ring;
    wherein the surface of the first ring is a continuous surface along a circumferential direction, and wherein the surface of the second ring is also a continuous surface along the circumferential direction; and
    wherein at least one of the surface of the first ring and the shaft assembly is positioned between the sensor and the surface of the second ring and substantially completely obstructs the surface of the second ring from a direct line of sight view of the sensor throughout the entire operation.

2. The feedback sensor system of claim 1, wherein the parameter is a magnetic flux.

3. The feedback sensor system of claim 1, wherein the one or more first ring features are a plurality of teeth spaced along the surface of the first ring, wherein the one or more second ring features are a plurality of teeth spaced along the surface of the second ring, and wherein the feedback sensor system is configured to determine an angular position of the first ring relative to the second ring.

4. The feedback sensor system of claim 1, wherein the one or more of first ring features are a plurality of teeth spaced along the surface of the first ring, wherein the one or more of second ring features are a plurality of helical ridges extending from the surface of the second ring, and wherein the feedback sensor system is configured to determine an axial position of the first ring relative to the second ring.

5. The feedback sensor system of claim 1, wherein the surface of the first ring further includes a marker having a geometry different than the plurality of first ring features for indicating a new revolution of the first ring.

6. The feedback sensor system of claim 5, wherein the marker and the one or more first ring features are evenly spaced along the surface of the first ring, and wherein the one or more second ring features are evenly spaced along the surface of the second ring.

7. The feedback sensor system of claim 1, wherein the feedback sensor system is configured for use with a gas turbine engine, wherein the first ring is configured to be mounted on a rotating shaft of the gas turbine engine, wherein the second ring is configured to be mounted on an actuation member of the gas turbine engine, the actuation member configured for changing a pitch of a fan blade of the gas turbine engine, and wherein the sensor is configured to be mounted on a stationary component of the gas turbine engine.

8. The feedback sensor system of claim 1, wherein the surface of the second ring has a different number of second ring features than the surface of the first ring has first ring features.

9. The feedback sensor system of claim 1, wherein the surface of the second ring has at least four less second ring features than the surface of the first ring has first ring features.

10. The feedback sensor system of claim 1, wherein the first ring is a continuous ring defining a thickness at each of the one or more first ring features that is greater than a thickness between each adjacent first ring features, and wherein the second ring is also a continuous ring defining a thickness through the one or more second ring features that is greater than a thickness between each adjacent second ring features.

11. The feedback sensor system of claim 1, wherein the sensor defines a sensing axis, and wherein the sensor is positioned such that the sensing axis extends through the surface of the first ring and the surface of the second ring.

12. The feedback sensor system of claim 1, wherein the surface of the first ring extends substantially parallel to the surface of the second ring such that the second ring is nested within the first ring.

13. The feedback sensor system of claim 1, wherein the first ring is positioned between the sensor and the shaft assembly.

14. The feedback sensor system of claim 1, wherein the shaft assembly is positioned between the sensor and the first ring.

15. A gas turbine engine defining an axial direction and a circumferential direction, the gas turbine engine comprising:
   a turbine section mechanically coupled to a compressor section through a shaft;
   a fan driven by the shaft, the fan including a plurality of fan blades;
   an actuation member in mechanical communication with the plurality of fan blades for changing a pitch of the plurality of fan blades; and
   a feedback sensor system including
      a first ring coupled to or formed integrally with the shaft, the first ring including a surface having one or more first ring features;
      a second ring rotatable with the actuation member of the gas turbine engine and enclosed within the shaft, the second ring including a surface having one or more second ring features; and
      a sensor spaced from the shaft and the first ring and positioned on an opposite side of the shaft than the second ring, the sensor being directed at the surface of the first ring and the surface of the second ring for sensing a parameter influenced by the one or more first ring features and the one or more second ring features to determine a position of the first ring relative to the second ring;
      wherein the surface of the first ring is a continuous surface along the circumferential direction, and wherein the surface of the second ring is also a continuous surface along the circumferential direction; and
      wherein at least one of the surface of the first ring and the shaft assembly is positioned between the sensor and the surface of the second ring and substantially obstructs the surface of the second ring from a direct line of sight view of the sensor throughout the entire operation.

16. The gas turbine engine of claim 15, wherein the parameter is a magnetic flux.

17. The gas turbine engine of claim 15, wherein the one or more first ring features are a plurality of teeth spaced along the surface of the first ring, wherein the one or more second ring features are a plurality of teeth spaced along the surface of the second ring, and wherein the feedback sensor system is configured to sense an angular position of the first ring relative to the second ring.

18. The gas turbine engine of claim 15, wherein the one or more of first ring features are a plurality of teeth spaced along the surface of the first ring, wherein the one or more of second ring features are a plurality of helical ridges extending from the surface of the second ring, and wherein the feedback sensor system is configured to sense an axial position of the first ring relative to the second ring.

* * * * *